US008812209B2

(12) United States Patent
Runde

(10) Patent No.: US 8,812,209 B2
(45) Date of Patent: *Aug. 19, 2014

(54) SYSTEM AND METHOD FOR DETECTING LOCKUP CLUTCH ON-COMING CAPACITY

(71) Applicant: Jeffrey K. Runde, Fishers, IN (US)

(72) Inventor: Jeffrey K. Runde, Fishers, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/847,318

(22) Filed: Mar. 19, 2013

(65) Prior Publication Data
US 2013/0218431 A1 Aug. 22, 2013

Related U.S. Application Data

(63) Continuation of application No. 12/421,159, filed on Apr. 9, 2009, now Pat. No. 8,401,755.

(60) Provisional application No. 61/045,126, filed on Apr. 15, 2006.

(51) Int. Cl.
*G06F 7/00* (2006.01)
*G06F 17/00* (2006.01)
*G06F 19/00* (2011.01)

(52) U.S. Cl.
USPC ................... 701/68; 477/169; 192/3.31

(58) Field of Classification Search
USPC .......... 701/59, 67, 68, 84, 86, 87; 477/62, 63, 477/78, 166, 168, 169, 176; 192/3.31
See application file for complete search history.

(56) References Cited

U.S. PATENT DOCUMENTS

| | | | |
|---|---|---|---|
| 5,916,293 A | 6/1999 | Katakura et al. | |
| 6,085,136 A | 7/2000 | Katakura et al. | |
| 6,254,507 B1 | 7/2001 | Downs | |
| 7,069,767 B2 | 7/2006 | Runde et al. | |
| 8,050,833 B2 | 11/2011 | Runde et al. | |
| 8,060,286 B2 | 11/2011 | Kluemper et al. | |
| 8,150,589 B2 | 4/2012 | Runde | |
| 8,401,755 B2 * | 3/2013 | Runde | 701/68 |
| 8,433,488 B2 * | 4/2013 | Runde et al. | 701/67 |
| 8,538,649 B2 * | 9/2013 | Runde | 701/67 |
| 2001/0003322 A1 | 6/2001 | Kon et al. | |

(Continued)

OTHER PUBLICATIONS

Jun Jin et al., "Dynamic Performance Analysis of Pump Impeller Rotational Speed Hydraulic Torque-Converter," 2007, Energy Conservation Technology (Journal; Harbin Institute of Technology, Heilongjiang, Harbin 150001, China), vol. 25, Issue 143, pp. 231-233.

*Primary Examiner* — Jeffrey Shapiro
(74) *Attorney, Agent, or Firm* — Barnes & Thornburg LLP

(57) ABSTRACT

A dynamic model is stored in memory that defines torque transmitted by a lockup clutch in a torque converter as a function of a plurality of torque converter operating parameters. A lockup clutch command to control engagement the lockup clutch is asserted, and thereafter a number of the plurality of torque converter operating parameters are monitored. The model is continually solved using the monitored operating parameters to determine torque transmitted by the lockup clutch over time, and a lockup clutch on-coming capacity signal is produced if the torque transmitted by the lockup clutch exceeds a torque threshold.

20 Claims, 8 Drawing Sheets

(56) References Cited

U.S. PATENT DOCUMENTS

| | | |
|---|---|---|
| 2003/0153428 A1 | 8/2003 | Kitano et al. |
| 2005/0121277 A1 | 6/2005 | Segawa et al. |
| 2005/0283277 A1 | 12/2005 | Schulz |
| 2009/0105918 A1 | 4/2009 | Kobayashi et al. |
| 2009/0259375 A1 | 10/2009 | Runde |
| 2009/0259376 A1 | 10/2009 | Runde |
| 2012/0031723 A1 | 2/2012 | Runde et al. |
| 2012/0186928 A1 | 7/2012 | Runde |

* cited by examiner

SYSTEM AND METHOD FOR DETECTING LOCKUP CLUTCH ON-COMING CAPACITY

CROSS REFERENCE TO RELATED APPLICATION

This application is a continuation application of U.S. application Ser. No. 12/421,159, entitled "SYSTEM AND METHOD FOR DETECTING LOCKUP CLUTCH ON-COMING CAPACITY," which was filed on Apr. 9, 2009 and which claims priority to U.S. Provisional Patent Application No. 61/045,126 filed on Apr. 15, 2006, the entirety of both of which is incorporated herein by reference.

TECHNICAL FILED

The present invention relates generally to torque converters that serve as interfaces between internal combustion engines and automatic transmissions in mobile vehicles, and more specifically to the control of lockup clutches in such torque converters.

BACKGROUND

Torque converters are commonly used as an interface between an internal combustion engine and a transmission having a number of automatically selectable gear ratios. Some torque converters include a so-called lockup clutch that is connected between the pump and turbine of the torque converter, and that is engaged under certain operating conditions to rigidly connect the pump and turbine together. It is desirable to be able to detect, during engagement of the lockup clutch, when the lockup clutch is transmitting at least a discernable amount of torque.

SUMMARY

The present invention may comprise one or more of the features recited in the attached claims, and/or one or more of the following features and combinations thereof. In a torque converter having a pump that is rotatably driven by an internal combustion engine and that is fluidly coupled to a turbine, and a lockup clutch connected between pump and the turbine, a method for detecting lockup clutch on-coming capacity may comprise retrieving from memory a dynamic model that defines torque transmitted by the lockup clutch as a function of a plurality of torque converter operating parameters, asserting a lockup clutch command to control engagement the lockup clutch, monitoring a number of the plurality of torque converter operating parameters after asserting the lockup clutch command, continually solving the model using the monitored operating parameters to determine torque transmitted by the lockup clutch over time, and producing a lockup clutch on-coming capacity signal if the torque transmitted by the lockup clutch exceeds a torque threshold.

The lockup clutch command may comprise a fill phase followed by an initial lockup clutch activation value. Monitoring a number of the plurality of torque converter operating parameters and continually solving the model may be carried out after the initial lockup clutch activation value is asserted. The method may further comprise determining inertia of the engine, and one of the plurality of torque converter operating parameters included in the model may accordingly be the inertia of the engine. Monitoring a number of the plurality of torque converter operating parameters may comprise monitoring torque applied by the engine to the pump, monitoring rotational speed of the pump, determining angular acceleration of the pump based on the monitored rotational speed of the pump and monitoring rotational speed of the turbine, and the model may define torque transmitted by the lockup clutch as a function of the inertia of the engine, the torque applied by the engine to the pump, the rotational speeds of the pump and the turbine and the angular acceleration of the pump. The method may further comprise determining torque transmitted by the pump as a function of the rotational speed of the pump and the rotational speed of the turbine. In one embodiment, the dynamic model may define torque transmitted by the lockup clutch according to the equation: $T_{LU}=T_E-T_P-(I_E*PA)$, where $T_{LU}$ is the torque transmitted by the lockup clutch, $T_E$ is the torque applied by the engine to the pump, $T_P$ is the torque transmitted by the pump, $I_E$ is the inertia of the engine and PA is the angular acceleration of the pump. Alternatively, the method may further comprise determining an initial value of the rotational speed of the pump during the fill phase of the lockup clutch command, determining an initial value of the rotational speed of the turbine during the fill phase of the lockup clutch command, receiving an initial value of a reported engine output torque produced by a controller during the fill phase of the lockup clutch command, wherein the controller is configured to control operation of the engine, and determining a torque offset value as a function of the initial values of the rotational speed of the pump, the rotational speed of the turbine and the reported engine output torque. Monitoring torque applied by the engine to the pump may comprise monitoring reported engine output torque produced by the controller after the initial lockup clutch activation value is asserted and computing a compensated engine output torque as a function of the torque offset value and the reported engine output torque produced by the controller after the initial lockup clutch activation value is asserted. In this embodiment, the dynamic model may define torque transmitted by the lockup clutch according to the equation: $T_{LU}=T_{EC}-T_P-(I_E*PA)$, where $T_{LU}$ is the torque transmitted by the lockup clutch, $T_{EC}$ is the compensated engine output torque, $T_P$ is the torque transmitted by the pump, $I_E$ is the inertia of the engine and PA is the angular acceleration of the pump.

In a torque converter having a pump that is rotatably driven by an internal combustion engine and that is fluidly coupled to a rotatable turbine, and a lockup clutch connected between pump and the turbine, a method for detecting lockup clutch on-coming capacity may comprise determining an inertia of the engine, monitoring torque applied by the engine to the pump, monitoring torque transmitted by the pump, monitoring angular acceleration of the pump, continually computing torque transmitted by the lockup clutch as a function of the inertia of the engine, the torque applied by the engine to the pump, the torque transmitted by the pump, and the angular acceleration of the pump, and producing a lockup clutch on-coming capacity signal if the torque transmitted by the lockup clutch exceeds a torque threshold.

The method may further comprise asserting a lockup clutch command to engage the lockup clutch. The lockup clutch command may include a fill phase followed by an initial lockup clutch activation value. Monitoring torque applied by the engine to the pump, monitoring torque transmitted by the pump, monitoring angular acceleration of the pump and continually computing torque transmitted by the lockup clutch may all carried out after asserting the initial lockup clutch activation value.

In one embodiment, continually computing torque transmitted by the lockup clutch may comprise continually computing the torque according to the equation: $T_{LU}=T_E-T_P-(I_E*PA)$, where $T_{LU}$ is the torque transmitted by the lockup clutch, $T_E$ is the torque applied by the engine to the pump, $T_P$ is the torque transmitted by the pump, $I_E$ is the inertia of the engine and PA is the angular acceleration of the pump.

In an alternative embodiment, the method may further comprise determining a compensated torque value as a function of a torque offset value and a reported engine output torque produced by a controller configured to control operation of the engine, and the torque applied by the engine to the pump may be the compensated torque value. Illustratively, the torque offset value may be determined by determining an initial pump rotational speed and an initial turbine rotational speed during the fill phase of the lockup clutch command, computing an initial pump torque as a function of the initial pump and turbine rotational speeds, determining an initial value of the reported engine output torque during the fill phase of the lockup clutch command, and computing the torque offset value as a function of the initial pump torque and the initial value of the reported engine output torque. In this embodiment, continually computing torque transmitted by the lockup clutch may comprise continually computing the torque according to the equation: $T_{LU} = T_{EC} - T_P - (I_E * PA)$, where $T_{LU}$ is the torque transmitted by the lockup clutch, $T_{EC}$ is the compensated torque value, $T_P$ is the torque transmitted by the pump, $I_E$ is the inertia of the engine and PA is the angular acceleration of the pump.

In either case, the method may further comprise monitoring rotational speed of the pump, and monitoring rotational speed of the turbine. Monitoring torque transmitted by the pump may comprise determining the torque transmitted by the pump as a function of the rotational speed of the pump and the rotational speed of the turbine. Determining inertia of the engine may comprise receiving a reported engine inertia value produced by a control circuit configured to control operation of the engine. Alternatively, determining inertia of the engine may comprise retrieving a stored engine inertia value from memory.

A system for detecting lockup clutch on-coming capacity in a torque converter may comprise a turbine engaging an input shaft of a transmission, a pump engaging an output shaft of an internal combustion engine and fluidly coupled to the turbine, the lockup clutch connected between the pump and the turbine, a first sensor configured to produce a pump speed signal corresponding to a rotational speed of the pump, a second sensor configured to produce a turbine speed signal corresponding to a rotational speed of the turbine, and a control circuit including a memory having instructions stored therein that are executable by the control circuit to compute angular acceleration of the pump as a function of the pump speed signal, to compute torque transmitted by the lockup clutch as a function of the pump speed signal, the turbine speed signal, an inertia of the engine, an output torque produced by the engine and the angular acceleration of the pump, and to produce a lockup clutch on-coming capacity signal if the torque transmitted by the lockup clutch exceeds a threshold torque.

The system may further comprise an actuator configured to be responsive to a lockup clutch activation command to control engagement of the lockup clutch. The instructions stored in the memory may further include instructions that are executable by the control circuit to produce the lockup clutch activation command, wherein the lockup clutch activation command comprises a fill phase followed by an initial lockup clutch activation value. The instructions stored in the memory may further include instructions that are executable by the control circuit to begin computing the torque transmitted by the lockup clutch and comparing the torque transmitted by the lockup clutch to the threshold torque after the initial lockup clutch activation value is asserted. The system may further comprise an engine controller configured to control, at least in part, operation of the engine. The control circuit may be configured to receive engine output torque values, corresponding to torque produced by the engine, from the engine controller. The system may further comprise a data link established between a communication port of the control circuit and a communication port of the engine controller. The engine controller may be configured to supply the engine output torque values to the data link in the form of engine output torque messages. The control circuit may be configured to retrieve the engine output torque messages from the data link.

The instructions stored in the memory may include instructions that are executable by the control circuit to process the engine output torque messages to determine the output torque produced by the engine. The instructions stored in the memory include instructions that are executable by the control circuit to compute torque transmitted by the pump as a function of the pump speed signal and the turbine speed signal, and to compute the torque transmitted by the lockup clutch according to the equation: $T_{LU} = T_E - T_P - (I_E * PA)$ where $T_{LU}$ is the torque transmitted by the lockup clutch, $T_E$ is the output torque produced by the engine, $T_P$ is the torque transmitted by the pump, $I_E$ is the inertia of the engine and PA is the angular acceleration of the pump.

The instructions stored in the memory may further include instructions that are executable by the control circuit to process at least one of the engine output torque messages to determine an initial engine output torque value, determine from the pump speed signal an initial pump speed and determine from the turbine speed signal an initial turbine speed all during the fill phase of the lockup clutch activation command, and to then compute a torque offset value as a function of the initial engine output torque value, the initial pump speed and the initial turbine speed. The instructions stored in the memory may further include instructions that are executable by the control circuit to determine the output torque produced by the engine after the initial lockup clutch activation value is asserted by processing the engine output torque messages to determine corresponding engine output torque values, and then computing the output torque produced by the engine in the form of a compensated engine output torque as a function of the engine output torque values and the torque offset value. The instructions stored in the memory may include instructions that are executable by the control circuit to compute torque transmitted by the pump as a function of the pump speed signal and the turbine speed signal, and to compute the torque transmitted by the lockup clutch according to the equation: $T_{LU} = T_{EC} - T_P - (I_E * PA)$, where $T_{LU}$ is the torque transmitted by the lockup clutch, $T_{EC}$ is the compensated engine output torque, $T_P$ is the torque transmitted by the pump, $I_E$ is the inertia of the engine and PA is the angular acceleration of the pump.

The engine controller may be configured to supply an inertia value corresponding to the inertia of the engine to the data link in the form of an engine inertia message. The control circuit may be configured to retrieve the inertia message from the data link and process the inertia message to determine the inertia of the engine. Alternatively, the memory may have stored therein a value of the inertia of the engine. The instructions stored in the memory may further include instructions that are executable by the control circuit to determine the inertia of the engine by retrieving the value of the inertia of the engine.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
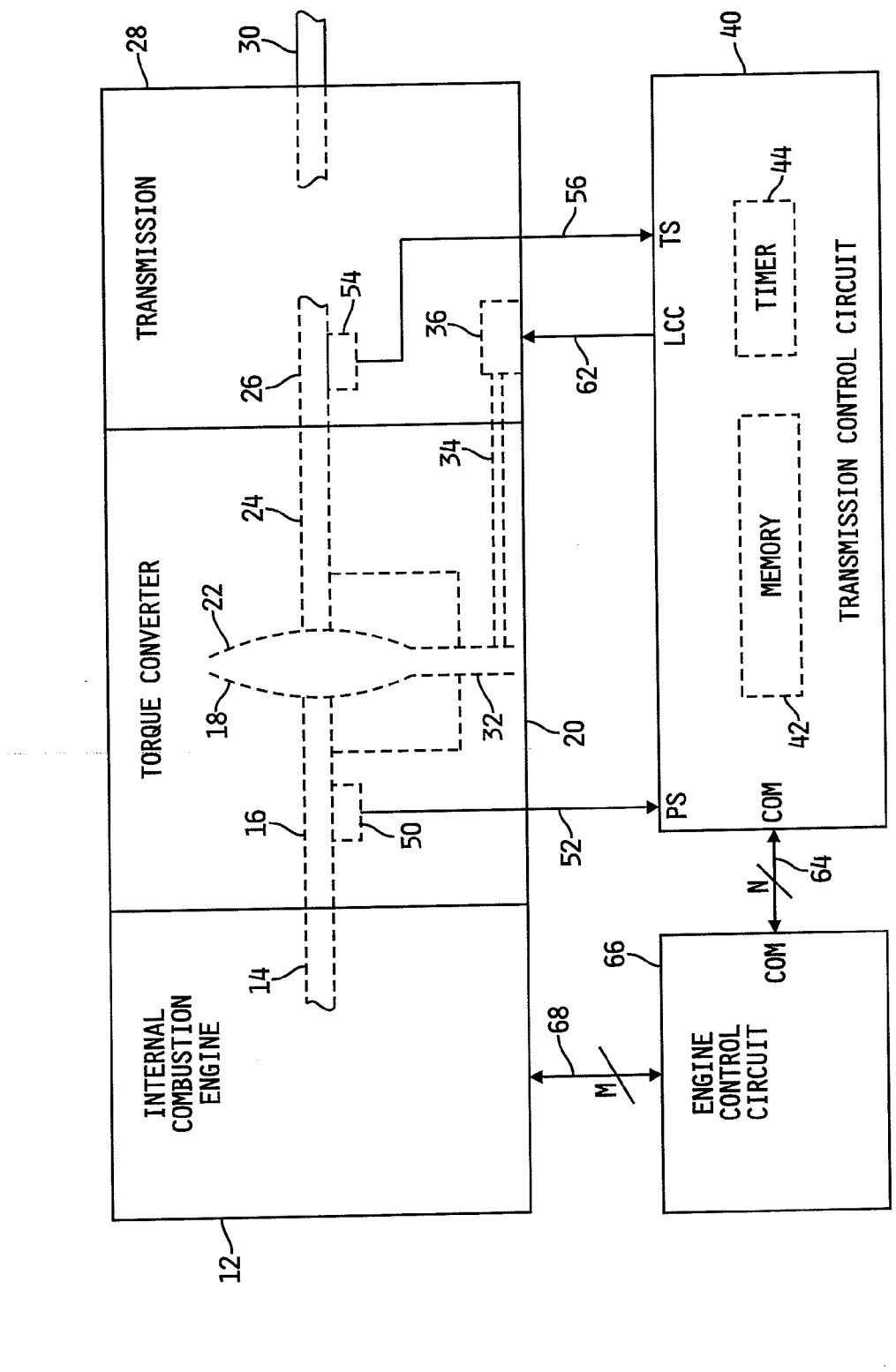
FIG. 1 is a block diagram and schematic view of one illustrative embodiment of a system for controlling operation of a lock up clutch in a torque converter.

Referring now to FIG. 1, a block diagram and schematic view of one illustrative embodiment of a system 10 for controlling operation of a lock up clutch in a torque converter is shown. In the illustrated embodiment, the system 10 includes an internal combustion engine 12 that is configured to rotatably drive an output shaft 14 that is coupled to an input or pump shaft 16 of a conventional torque converter 20. The input or pump shaft 16 is attached to an impeller or pump 18 that is rotatably driven by the output shaft 14 of the engine 12. The torque converter 20 further includes a turbine 22 that is attached to a turbine shaft 24, and the turbine shaft 24 is coupled to, or integral with, a rotatable input shaft 26 of a transmission 28. The transmission 28 is conventional and includes a number of automatically selected gear ratios. An output shaft 30 of the transmission is coupled to, and rotatably drives, a number of wheels (not shown) of a vehicle carrying the engine 12, torque converter 20 and transmission 28.

A conventional lockup clutch 32 is connected between the pump 18 and the turbine 22, and the lockup clutch 32 is fluidly coupled to a fluid actuator 36 via a fluid passageway 34. The operation of the torque converter 20 is conventional in that the torque converter 20 is operable in a so-called "torque converter" mode during certain operating conditions such as vehicle launch, low speed and certain gear shifting conditions. In the torque converter mode, the lockup clutch 32 is disengaged and the pump 18 rotates at the rotational speed of the engine output shaft 14 while the turbine 22 is rotatably actuated by the pump 18 through a fluid (not shown) interposed between the pump 18 and the turbine 22. In this operational mode, torque multiplication occurs through the fluid coupling such that the turbine shaft 24 is exposed to more drive torque than is being supplied by the engine 12, as is known in the art. The torque converter 20 is alternatively operable in a so-called "lockup" mode during other operating conditions, such as when certain gear ratios of the transmission 28 are engaged. In the lockup mode, the lockup clutch 32 is engaged and the pump 18 is thereby secured to directly to the turbine 22 so that the engine output shaft 14 is directly coupled to the input shaft 26 of the transmission 28, as is also known in the art.

The system 10 further includes a transmission control circuit 40 that includes a memory unit 42 and a conventional timer circuit 44. The transmission control circuit 40 is illustratively microprocessor-based, and the memory unit 42 generally includes instructions stored therein that are executable by the transmission control circuit 40 to control operation of the torque converter 20 and the transmission 28. It will be understood, however, that this disclosure contemplates other embodiments in which the transmission control circuit 40 is not microprocessor-based, but is configured to control operation of the torque converter 20 and/or transmission 28 based on one or more sets of hardwired instructions and/or software instructions stored in the memory unit 42.

In the system 10 illustrated in FIG. 1, the torque converter 20 and the transmission 28 each include one or more sensors configured to produce sensor signals that are indicative of one or more operating states of the torque converter 20 and/or the transmission 28. For example, the torque converter 20 includes the conventional speed sensor 50 that is positioned and configured to produce a speed signal corresponding to the rotational speed of the torque converter pump shaft 16 (which is also the rotational speed of the output shaft 14 of the engine 12). The speed sensor 50 is electrically connected to a pump speed input, PS, of the transmission control circuit 40 via a signal path 52, and the transmission control circuit 40 is operable to process the speed signal produced by the speed sensor 50 in a conventional manner to determine the rotational speed of the pump shaft 16. The transmission 28 further includes a second speed sensor 54 that is positioned and configured to produce a speed signal corresponding to the rotational speed of the input shaft 26 of the transmission 28. The input shaft 26 of the transmission 28 is directly coupled to, or integral with, the turbine shaft 24, and the speed sensor 54 may alternatively be positioned and configured to produce a speed signal corresponding to the rotational speed of the turbine shaft 24. In any case, the speed sensor 54 may be conventional, and is electrically connected to a turbine speed input, TS, of the transmission control circuit 40 via a signal path 56. The transmission control circuit 40 is configured to process the speed signal produced by the speed signal 54 in a conventional manner to determine the rotational speed of the turbine shaft 24/input shaft 26 of the transmission 28.

In the illustrated embodiment, the transmission 28 further includes one or more actuators configured to control various operations within the torque converter 20 and/or transmission 28. For example, the transmission 28 includes an actuator 36 that is electrically connected to a lockup clutch command output, LCC, of the transmission control circuit 40 via a signal path 62. The actuator 36 is responsive to the lockup clutch command signal, LCC, produced by the transmission control circuit 40 on the signal path 62 to control the pressure of fluid within the fluid passageway 34, and thus the actuating pressure supplied to the lockup clutch 32. Illustratively, the actuator 36 may be provided in the form of a conventional charge pump fluidly coupled to a source of fluid, e.g., transmission oil, although this disclosure contemplates other embodiment in which the actuator may alternatively be provided in the form of a conventional valve, pump or the like, that is fluidly coupled to a source of fluid, e.g., transmission oil.

In the illustrated embodiment, the system 10 further includes an engine control circuit 66 having an input/output port (I/O) that is electrically coupled to the engine 12 via a number, M, of signal paths, wherein M may be any positive integer. The engine control circuit 66 may be conventional, and is operable to control and manage the overall operation of the engine 12. The engine control circuit 66 further includes a communication port, COM, that is electrically connected to a similar communication port, COM, of the transmission control circuit 40 via a number, N, of signal paths 64, wherein N may be any positive integer. The one or more signal paths 64 are typically referred to collectively as a data link. Generally, the engine control circuit 66 and the transmission control circuit 40 are operable to share information via the one or more signal paths 64 in a conventional manner. In one embodiment, for example, the engine control circuit 66 and transmission control circuit 40 are operable to share information via the one or more signal paths 64 in the form of one or more messages accordance with a society of automotive engineers (SAE) J-1939 communications protocol, although this disclosure contemplates other embodiments in which the engine control circuit 66 and the transmission control circuit 40 are operable to share information via the one or more signal paths 64 in accordance with one or more other conventional communication protocols.

As it relates to this disclosure, the transmission control circuit 40 is operable to receive certain operating information relating to operation of the engine 12 from the engine control circuit 66 via the one or more signal paths 64 in a conventional manner. For example, the engine control circuit 66 is configured in a conventional manner to determine the instantaneous output torque produced by the engine 12, and in the illustrated embodiment the engine control circuit 66 is operable to supply the instantaneous engine output torque information to the transmission control circuit 40 via the one or more signal paths 64, such as in the form of a message that the transmission control circuit 40 may process to determine a corresponding engine output torque value. As another example, the engine control circuit 66 is operable in a conventional manner to determine the rotational speed of the engine output shaft 14, and in one embodiment the engine control circuit 66 is operable to supply the engine rotational speed information to the transmission control circuit 40 via the one or more signal paths 64. In this embodiment, the speed sensor 50 described hereinabove is not necessary, and may be omitted or otherwise be unused. Alternatively, the transmission control circuit 40 may be configured to determine the rotational speed of the engine 12 using both the signal produced by the sensor 50 and the engine rotational speed information supplied by the engine control circuit 66 via the one more signal paths 64.

Figure 2:
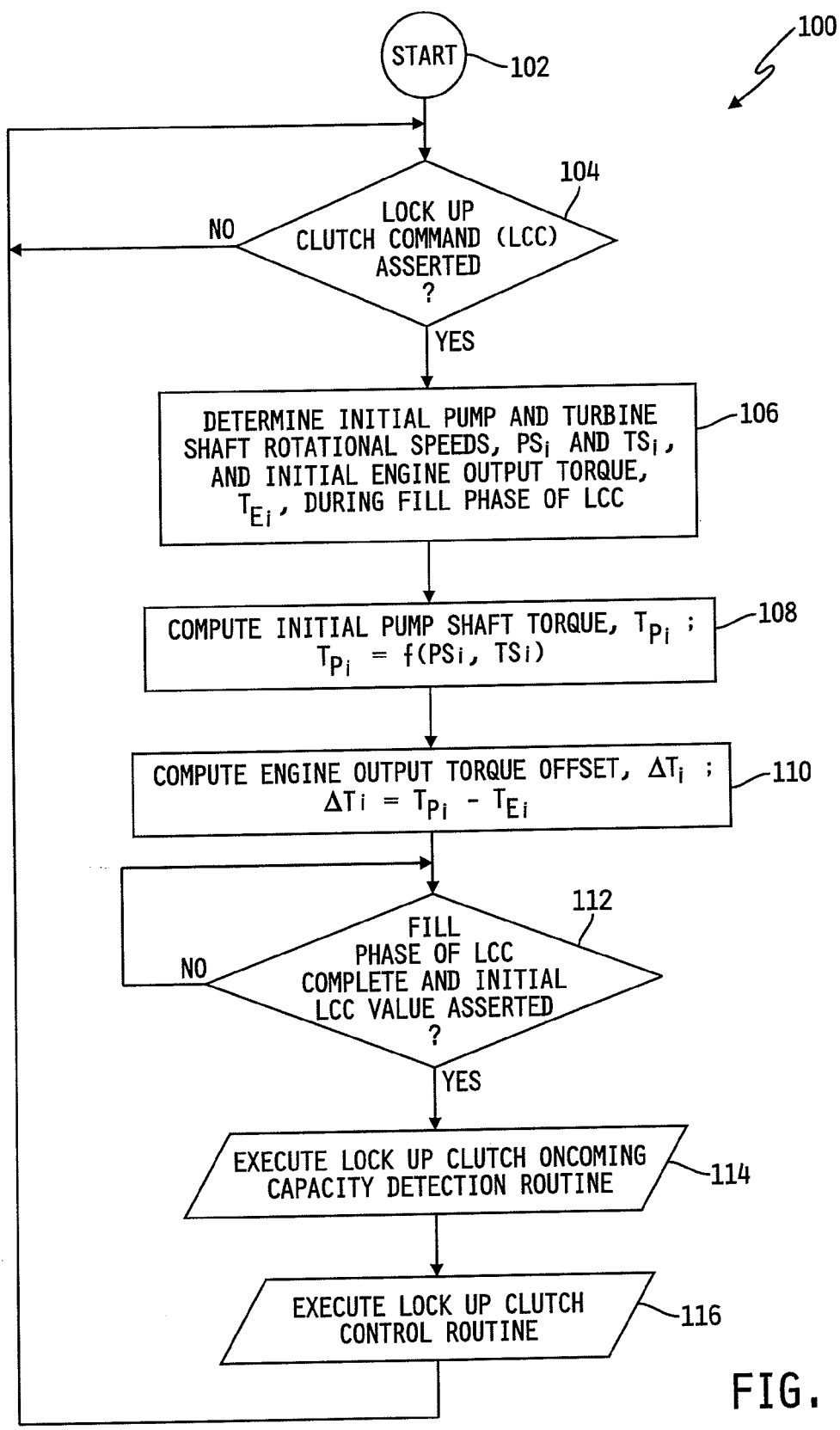
FIG. 2 is a flowchart of one illustrative embodiment of a process for controlling lock up clutch operation.
Figure 3:
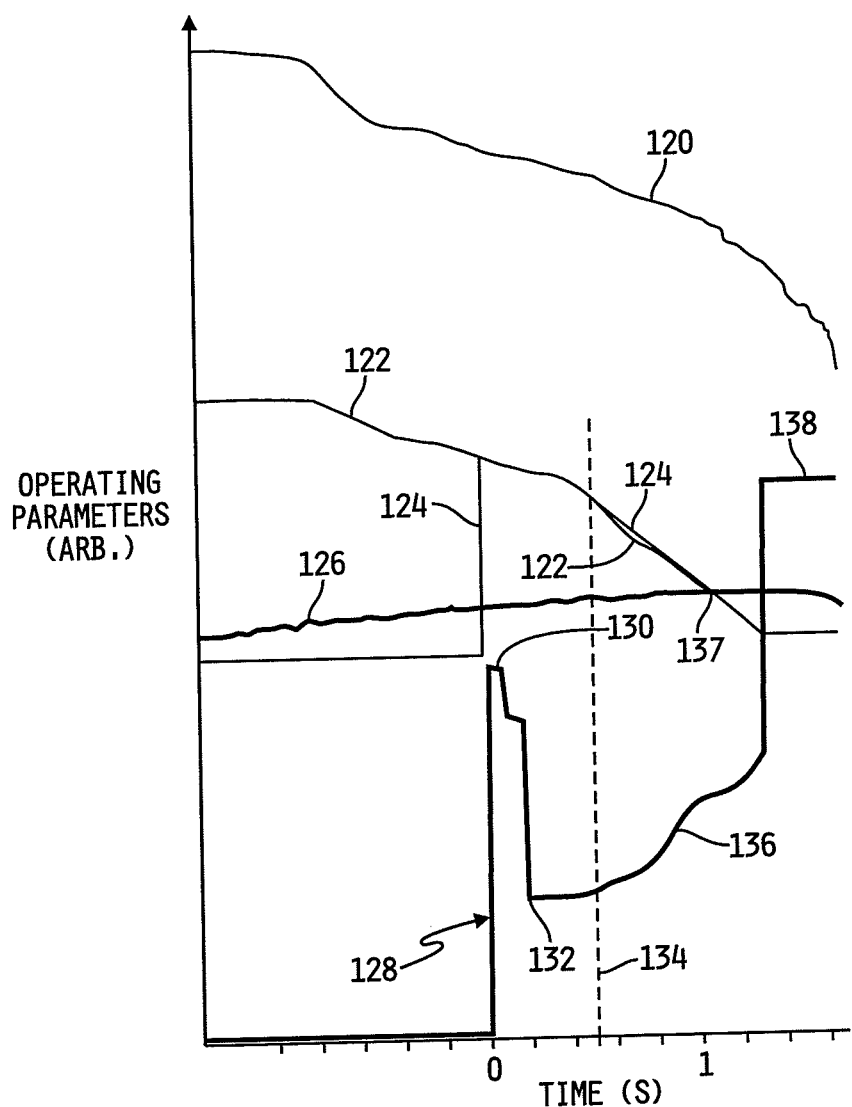
FIG. 3 is a plot of a number of operating parameters associated with lock up clutch operation.

Referring now to FIG. 2, a flow chart is shown of one illustrative embodiment of a process 100 for controlling operation of the lockup clutch 32. The process 100 is illustratively stored in the memory unit 42 of the transmission control circuit 40 in the form of one or more sets of instructions that are executable by the transmission control circuit 40 to control operation of the lockup clutch 42. The process 100 will be described with the aid of the plot of FIG. 3, which shows a number of operating parameters (arbitrary scale) over time (seconds). In particular, the plot of FIG. 3 shows engine output torque 120 (e.g., supplied to the transmission control circuit 40 by the engine control circuit 66), engine (pump shaft) speed 122 (e.g., produced by the speed sensor 50), turbine speed 126 (e.g., produced by the speed sensor 54) and lockup clutch pressure 128 (e.g., produced by the pressure sensor 58). Other signals and/or features are also shown in the plot of FIG. 3, and such other signals and/or signal features will be described hereinafter within the context of the process 100.

The process 100 begins at step 102, and thereafter at step 104 the transmission control circuit 40 is operable to determine if the lockup clutch command, LCC, has been asserted, i.e., is active. In the illustrated embodiment, the transmission control circuit 40 is operable to produce the lockup clutch command, LCC, according to one or more sets of instructions stored in the memory 42, and therefore has knowledge of the state of the lockup clutch command, LCC. If the transmission control circuit 40 determines at step 104 that the lockup clutch command, LCC, has not been asserted, the process 100 loops back to step 104. If, on the other hand, the transmission control circuit 40 determines at step 104 that the lockup clutch command, LCC, has been asserted, execution of the process 100 advances to step 106 where the transmission control circuit 40 is operable to determine initial pump and turbine shaft rotational speeds, $PS_i$ and $TS_i$, and initial engine output torque, $T_{Ei}$, during the fill phase of the lockup clutch command, LCC.

Referring to FIG. 3, lockup clutch pressure is represented by the waveform 128, and the lockup clutch pressure 128 generally follows the lockup clutch command, LCC. The wave form 128 thus represents the lockup clutch command, LCC, and the waveform 128 will be used herein to illustrate and described the operation of LCC. In any case, the lockup clutch command 128 illustrated in FIG. 3 includes a conventional fill phase followed by a controlled pressure increase until engagement of the lockup clutch 32 is achieved. The fill phase of the lockup clutch command 128 follows assertion of the lockup clutch command, and is identified by a rapid increase to a peak pressure 130 for a short duration followed by a rapid decrease in pressure to an initial pressure value or initial lockup clutch activation value 132. The fill phase is used in a conventional manner to cause the piston (not shown) of the lockup clutch 32 to travel rapidly toward, but not contact, a piston stop (not shown) defined by the lockup clutch 32 under high fluid pressure conditions. Following the fill phase, the lockup clutch pressure 128 is then controllably increased from the initial pressure value or initial lockup clutch activation value 132 to achieve engagement of the lockup clutch 32.

Referring again to FIG. 2, the transmission control circuit 40 is illustratively operable at step 106 to determine the initial pump shaft rotational speed $TS_i$, by monitoring the speed signal produced by the speed sensor 50. Alternatively or additionally, the transmission control circuit 40 may be operable at step 106 to determine the pump shaft rotational speed $PS_i$, based on engine rotational speed information supplied by the engine control circuit 66 to the transmission control circuit 40 via the one or more signal paths 64. The transmission control circuit 40 is illustratively operable at step 106 to determine the turbine shaft rotational speed, $TS_i$, by monitoring the speed signal produced by the speed sensor 54. The transmission control circuit 40 is further illustratively operable at step 106 to determine the initial engine output torque value $T_{Ei}$, by receiving the engine output torque information supplied by the engine control circuit 66 on the one or more signal paths 64. Illustratively, the transmission control circuit 40 is operable to determine $PS_i$, $TS_i$ and $T_{Ei}$, during an initial portion of the fill phase, e.g., just after the peak pressure 130 is achieved, although this disclosure contemplates alternate embodiments in which the transmission control circuit 40 is operable to determine $PS_i$, $TS_i$ and $T_{Ei}$, during one or more other portions of the fill phase, and/or during one or more other portions of the lockup clutch command, LCC, that follow the fill phase.

Following step 106, the transmission control circuit 40 is operable at step 108 to compute an initial pump shaft torque, $T_{Pi}$, as a function of the initial pump and turbine shaft rotational speed values, $PS_i$ and $TS_i$ respectively. In one embodiment, the transmission control circuit 40 is operable to compute the initial pump shaft torque value, $T_{Pi}$ according to the formula $T_{Pi} = a*PS_i^2 + b*PS_i*TS_i + c*TS_i^2$, although the transmission control circuit 40 may be alternatively operable at step 108 to compute the initial pump shaft torque value $T_{Pi}$ using one or more other conventional functions of $PS_i$ and $TS_i$, or as functions of more, fewer and/or different torque converter 20 and/or transmission 28 operating parameters. In any case, the process 100 advances from step 108 to step 110 where the transmission control circuit 40 is operable to compute an engine output torque offset value, $\Delta T_i$ according to the equation $\Delta T_i = T_{Pi} - T_{Ei}$.

Following step 110, the control circuit 40 is operable at step 112 to determine whether the fill phase of the lockup clutch command, LCC is complete and an initial LCC value has been asserted. Illustratively, the transmission control circuit 40 is operable to execute step 112 by monitoring the lockup clutch command, LCC, and to determine that the fill phase of the lockup clutch command is complete when the lockup clutch command, e.g., lockup clutch pressure command or other lockup clutch command from which lockup clutch pressure may be determined, drops from the peak fill phase pressure 130 to the initial pressure value or initial lockup clutch activation (LCC) value. If the transmission control circuit 40 determines that the fill phase of the lockup clutch command is not complete, the process 100 loops back to step 112. If, on the other hand, the transmission control circuit 40 determines at step 112 at the fill phase of LCC is complete and the initial LCC value has been asserted, the process 100 advances to step 114 where the transmission control circuit executes a lockup clutch oncoming capacity detection routine.

Figure 4:
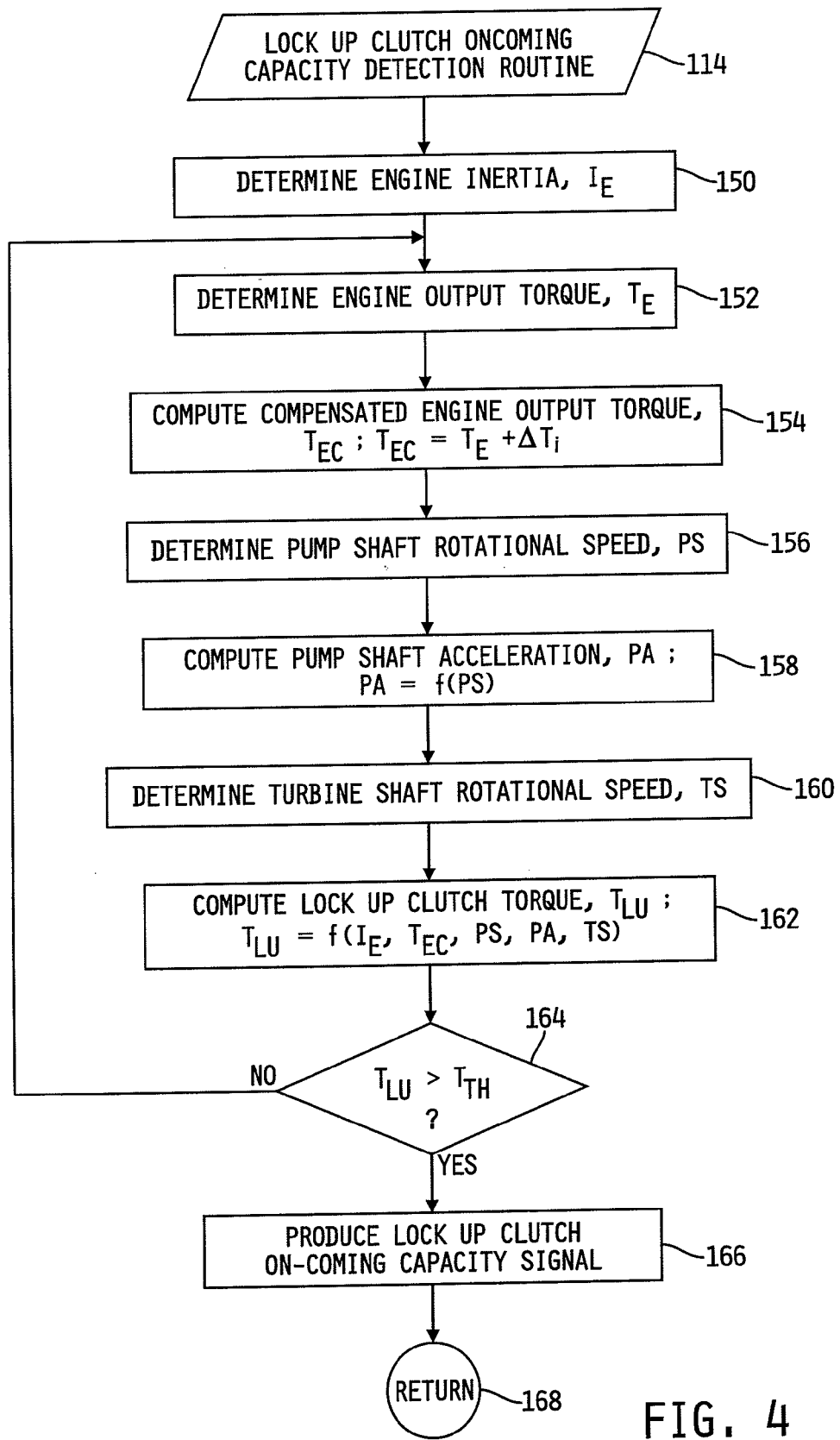
FIG. 4 is a flowchart of one illustrative embodiment of a process for detecting lockup clutch on-coming capacity.

Referring now to FIG. 4, one illustrative embodiment of the lockup clutch oncoming capacity detection routine 114 is shown. The lockup clutch oncoming capacity detection routine 114 begins at step 150 where the transmission control circuit 40 is operable to determine an engine inertia value, $I_E$, corresponding to an inertia associated with the engine 12. Illustratively, the engine inertia value, $I_E$, is stored in the memory unit 42, and the transmission control circuit 40 is operable to determine the engine inertia value $I_E$, at step 150 by retrieving $I_E$ from the memory unit 42. Alternatively, the engine inertia value, $I_E$, may be provided to the transmission control circuit 40 by the engine control circuit 66 via the one or more signal paths 64, such as in the form of a message that may be processed by the transmission control circuit 40 to determine the engine inertia value. Alternatively still, the transmission control circuit 40 may be operable at step 150 to compute the engine inertia value, $I_E$, based on one or more engine operating parameters supplied to the transmission control circuit 40 by the engine control circuit 66 via the one or more signal paths 64. Further alternatively, the engine control circuit 66 may be operable to compute the engine inertia value, $I_E$, based on one or more engine operating parameters, and to supply the engine inertia value, $I_E$, to the transmission control circuit 40 at step 150 via the one or more signal paths 64. In any case, the lockup clutch oncoming capacity detection routine advances from step 150 to step 152 where the transmission control circuit 40 is operable to determine an engine output torque value, $T_E$, corresponding to the output torque produced by the engine 12. Illustratively, the engine output torque value, $T_E$, corresponds to an instantaneous value of the engine output torque, and is supplied at step 152 to the transmission control circuit 40 by the engine control circuit 66 via the one or more signal paths 64 as described hereinabove.

Following step 152, the transmission control circuit 40 is operable at step 154 to compute a compensated engine output torque value, $T_{EC}$, as a function of the instantaneous engine output torque value, $T_E$, and the engine output torque offset value, $\Delta T_i$, which was computed at step 110 of the process 100 (see FIG. 2). This embodiment presumes that any inaccuracies in the engine output torque values, $T_E$, supplied by the engine control circuit 66 are uniform across all engine output torque values so that compensating engine output torque values, $T_E$, using the engine output torque offset value, $\Delta T_i$, effectively removes, or at least reduces, such inaccuracies across all engine output torque values within typical engine output torque ranges. Conversely, in embodiments in which the engine output torque value, $T_E$, produced by the engine control circuit 66 and supplied by the transmission control circuit 40 via the one or more signal paths 64 accurately reflects, or reflects within an acceptable error, the actual torque applied to the pump shaft 16 of the torque converter 20, step 110 of the process 100 and step 154 of the routine 114 may be omitted. In this case, the engine output torque values, $T_E$, supplied by the engine control circuit 66 to the transmission control circuit 40 via the one or more signal paths 64 may be used by the routine 114. In another alternative embodiment, step 110 of the process 100 and step 154 of the routine 114 may be omitted, and the transmission control circuit 40 may be operable at step 152 to determine the engine output torque, $T_E$, by estimating the torque applied to the pump shaft 16 of the torque converter 20 according to one or more conventional engine output torque models.

The routine 114 advances from step 154 to step 156 where the transmission control circuit 40 is operable to determine the pump shaft rotational speed, PS, corresponding to the rotational speed of the pump shaft 16 of the torque converter 20. The pump shaft rotational speed, PS, may be determined at step 156 by the transmission control circuit 40 as described hereinabove with respect to step 106 of the process 100. Following step 156, the transmission control circuit 40 is operable at step 158 to compute a pump shaft angular acceleration value, PA, as a function of the pump shaft rotational speed, PS, which was determined at step 156. Thereafter at step 160, the transmission control circuit 40 is operable to determine a turbine shaft rotational speed, TS, corresponding to a rotational speed of the turbine shaft 24 of the torque converter 20. The transmission control circuit 40 is illustratively operable to execute step 160 using any one or more of the techniques described hereinabove with respect to step 106 of the process 100.

Following step 160, the routine 114 advances to step 162 where the transmission control circuit 40 is operable to compute a lockup clutch torque value, $T_{LU}$, as a function of $I_E$, $T_{EC}$, PS, PA and TS. In one illustrative embodiment, for example, the transmission control circuit 40 is operable to execute step 162 by computing $T_{LU}$ according to the model: $T_{LU} = T_{EC} - T_P - (I_E * PA)$, where $T_P$ represents the amount of torque transmitted by the pump 18 of the torque converter 20. Illustratively, $T_P$ is computed by the transmission control circuit 40 as a function of PS and TS using a model-based transmitted torque model such as, but not limited to, that is described hereinabove with respect to step 108 of the process 100. Alternatively, such as in embodiments in which the engine output torque value, $T_E$, supplied by the engine control circuit 66 to the transmission control circuit 40 via one or more of the signal paths 64 is not compensated, the transmission control circuit 40 may be operable to determine the lockup clutch torque value, $T_{LU}$, according to the model: $T_{LU} = T_E - T_P - (I_E * PA)$, where $T_E$ represents an uncompensated value of the engine output torque that may be determined according to any one or more of the techniques described hereinabove. In any case, the lockup clutch torque value, $T_{LU}$, computed at step 162 represents an estimate, based on measured and/or estimated operating values, of the actual torque being transmitted by the lockup clutch 32 over time. As it relates to the plot of FIG. 3, the lockup clutch torque estimate, $T_{LU}$, computed at step 162 corresponds to the torque being transmitted by the lockup clutch 32 during the initial portion of the lockup clutch pressure 128 that occurs after the fill phase and after the initial pressure or initial lockup clutch activation value 132 is asserted. Illustratively, the $T_{LU}$ model is stored in the memory unit 42 of the transmission control circuit 40, and the transmission control circuit 40 is operable at step 162 to retrieve the $T_{LU}$ model from the memory unit 42, to insert current values of the torque converter operating parameters $I_E$, $T_{EC}$ (or $T_E$), PS, PA and TS into the model and to then solve the model equation for $T_{LU}$.

The routine 114 advances from step 162 to step 164 where the transmission control circuit 40 is operable to determine whether the lockup clutch torque value, $T_{LU}$, that was computed at step 162 is greater than a threshold torque value, $T_{TH}$. If not, execution of the routine 114 loops back to step 152. If, on the other hand, the transmission control circuit 40 determines at step 164 that the lockup clutch torque value $T_{LU}$ is greater than the threshold torque value $T_{TH}$, execution of the routine 114 advances to step 166 where the transmission control circuit 40 is operable to produce a lockup clutch on-coming capacity signal. As used herein, the term "on-coming clutch capacity" is defined as a condition in which the clutch in question, here the lockup clutch 32, is sufficiently engaged to transmit a discernable amount of torque. In this regard, the torque threshold, $T_{TH}$, illustratively corresponds to a threshold torque above which the lockup clutch 32 is transmitting a discernable amount of torque. In any case, the transmission control circuit 40 may be configured to produce the lockup clutch on-coming capacity signal at step 166 by providing a corresponding lockup clutch on-coming capacity value to one or more control algorithms that are being executed by, or that may be executed by, the transmission control circuit 40, by storing a lockup clutch on-coming capacity value in one or more locations in the memory unit 42, by supplying a lockup clutch on-coming capacity signal to the engine control circuit 66 via the one or more signal paths 64, or the like. In any case, execution of the routine 114 advances from step 166 to step 168 where the routine 114 is returned to step routine 114 to the process 100 of FIG. 2.

Referring again to FIG. 3, the pump shaft speed 122 generally decreases when engagement of the lockup clutch 32 is being commanded. As the pump shaft speed 122 decreases toward the turbine speed 126 following the fill phase of the lockup clutch command 128 and subsequent assertion of the initial pressure value or initial lockup clutch activation value 132, the torque transmitted by the lockup clutch 32 will increase slightly over time until the lockup clutch 32 begins to transmit a discernable amount of torque. This point in time is identified in FIG. 3 as 134, and corresponds to the point in time, following the fill phase of the lockup clutch command 128 at which the torque transmitted by the lockup clutch 32 is greater than $T_{TH}$. It is at this point that lockup clutch on-coming capacity is detected. The process illustrated in FIG. 4 is operable as just described to continually estimate the lockup clutch torque, $T_{LU}$, by continually solving the above lockup clutch torque model, and to detect lockup clutch on-coming capacity when the estimated lockup clutch torque, $T_{LU}$, exceeds the torque threshold, $T_{TH}$.

Figure 5:
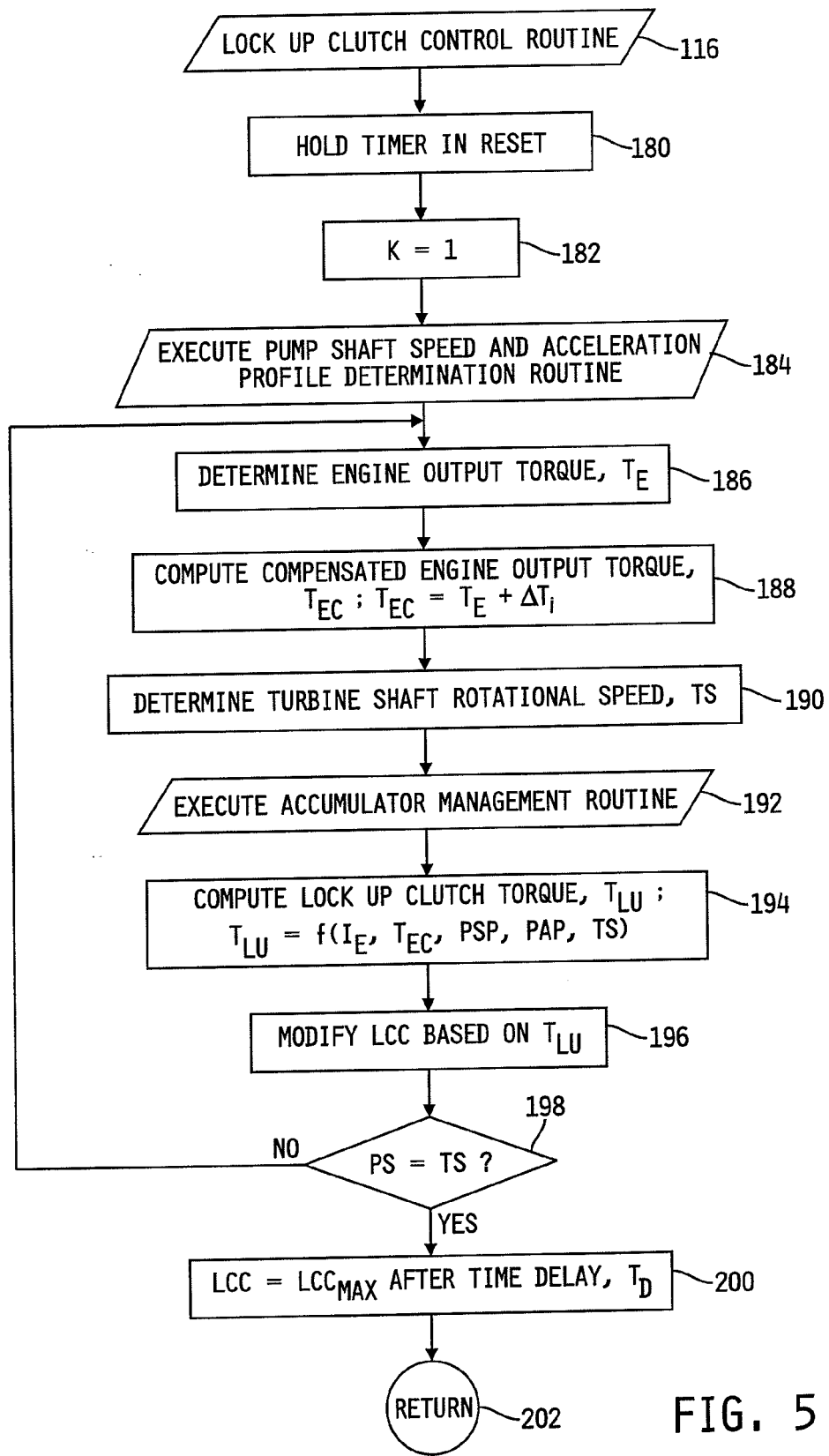
FIG. 5 is a flowchart of one illustrative embodiment of a process for controlling engagement of the lock up clutch following detection of lockup clutch on-coming capacity.

Referring again to FIG. 2, the process 100 advances from step 114 to step 116 where the transmission control circuit 40 is operable to execute a lockup clutch control routine. Referring now to FIG. 5, one illustrative embodiment of the lockup clutch control routine 116 is shown. In the illustrated embodiment, the lockup clutch control routine 116 begins at step 180 where the transmission control circuit 40 is operable to hold the timer 44 (see FIG. 1) in reset. Thereafter at step 182, the transmission control circuit 40 is operable to set a counter value, K, equal to one. Thereafter at step 184, the transmission control circuit 40 is operable to execute a pump shaft speed and an acceleration profile determination routine.

Figure 6:
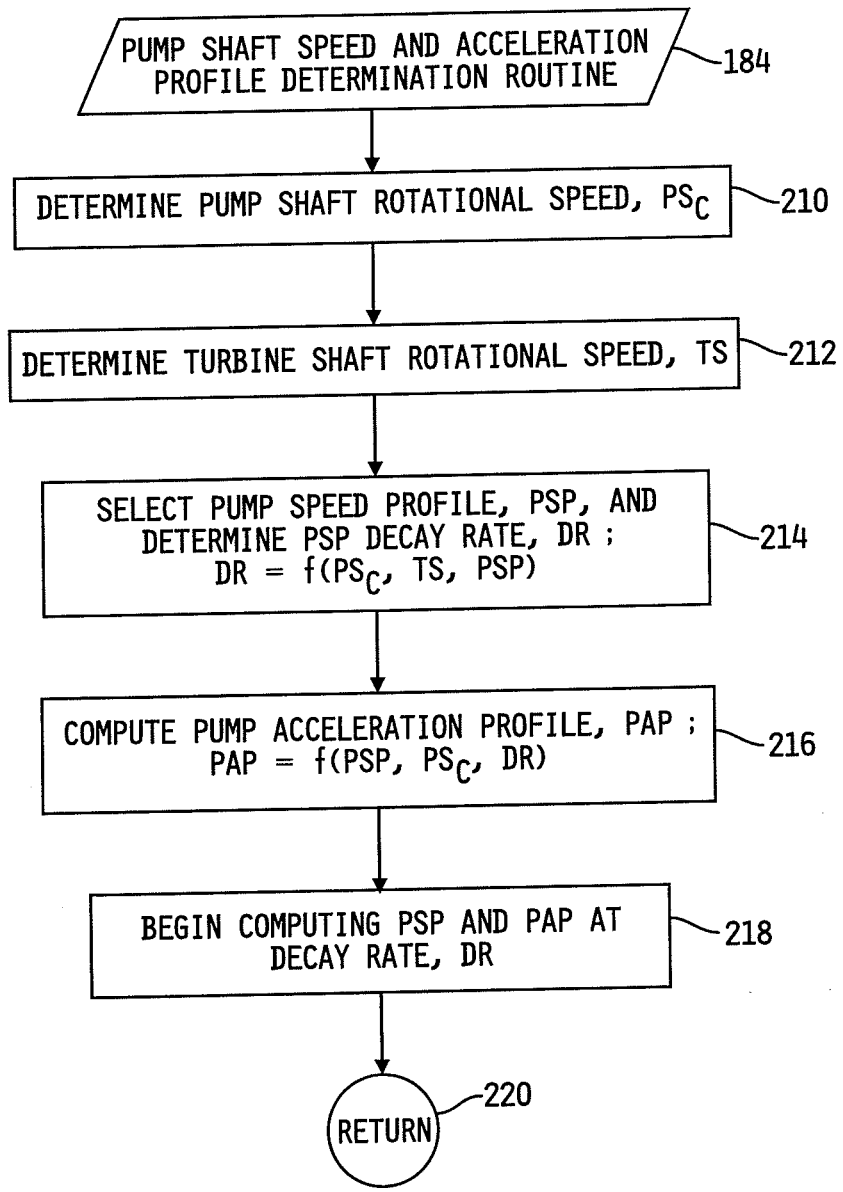
FIG. 6 is a flowchart of one illustrative embodiment of a process for determining pump shaft speed and acceleration profiles for use with the process of FIG. 5.

Referring to FIG. 6, one illustrative embodiment of the pump shaft speed and acceleration profile determination routine 184 is shown. In the illustrated embodiment, the pump shaft speed and acceleration profile determination routine 184 begins at step 210 where the transmission control circuit 40 is operable to determine a pump shaft rotational speed value, $PS_C$, corresponding to the rotational speed of the pump 16 of the torque converter 20 at, or just after, detection of on-coming capacity of the lockup clutch 32 as determined by the lockup clutch on-coming capacity detection routine 114 of FIG. 4. In the plot of FIG. 3, for example, the pump shaft rotational speed, $PS_C$, is identified by the intersection of the dashed vertical line 134 with the pump speed waveform 122. Following step 210, the transmission control circuit 40 is operable at step 212 to determine the turbine shaft rotational speed, TS, corresponding to the rotational speed of the turbine shaft 24 of the torque converter 20 at, or just after, detection of on-coming capacity of the lockup clutch 32. Illustratively, the transmission control circuit 40 is operable to determine the pump shaft rotational speed, $PS_C$, and the turbine shaft rotational speed, TS, using any of the techniques described hereinabove.

Following step 212, the transmission control circuit 40 is operable at step 214 to select a pump speed profile, PSP, and to determine a pump speed profile decay rate, DR, as a function of $PS_C$, TS and PSP. Illustratively, the pump speed profile, PSP, and decay rate, DR, correspond to a desired decrease, and rate thereof, of the rotational speed of the pump shaft 16 of the torque converter 20 from $PS_C$ toward the turbine shaft rotational speed, TS, such that the actual pump shaft rotational speed, PS, achieves synchronous speed with the turbine shaft rotational speed, TS (i.e., at synchronous speed, PS=TS), with a desired decreasing pump speed profile and decay rate. In the plot of FIG. 3, for example, the pump speed profile, PSP, 124 between the pump shaft rotational speed, $PS_C$, and synchronous speed 137 (PS=TS) is selected to be linear (the actual, non-linear pump speed 122 is also shown in FIG. 3 between $PS_C$ and synchronous speed, PS=TS), although this disclosure contemplates embodiments in which PSP is alternatively piece-wise linear, or nonlinear. The decay rate, DR, of the pump speed profile, PSP, will generally be selected to achieve synchronous speed (PS=TS) in a reasonable amount of time after detection of on-coming clutch capacity, taking into account the relative difference between $PS_C$ and TS as well as the selected profile, i.e., shape, of PSP. The decay rate, DR, may be constant or non-constant, and selection of the decay rate, DR, will generally depend upon the application. In any case, the transmission control circuit 40 is operable at step 214 to select PSP and DR by retrieving PSP and DR from the memory unit 42. It will be understood that the memory 42 may be programmed to store any number of pump speed profiles, PSP, and corresponding decay rate values, DR, and the transmission control circuit 40 may then be operable at step 214 to select the pump speed profile and corresponding decay rate value, or an appropriate one of a plurality of pump speed profiles and corresponding decay rate value based on one or more pre-established criteria.

The routine 184 advances from step 214 to step 216 where the transmission control circuit 40 is operable to compute a pump acceleration profile, PAP, as a function of the pump speed profile, PSP, the pump speed $PS_C$ and the decay rate, DR. In embodiments in which the pump speed profile, PSP, is linear, for example, PAP will be a constant value. In other embodiments in which the pump speed profile, PSP, is non-linear, PAP will be a function of time. In any case, the routine 184 advances from step 216 to step 218 where the transmission control circuit 40 is operable to begin continually computing PSP and PAP at the decay rate DR. Thereafter at step 220, the routine 184 is returned to the lockup clutch control routine 116 of FIG. 5.

Referring again to FIG. 5, the routine 116 advances from step 184 to step 186 where the transmission control circuit 40 is operable to determine the engine output torque, $T_E$, using any one of the techniques described hereinabove. Thereafter at step 188, the transmission control circuit 40 is operable to compute a compensated engine output torque value, $T_{EC}$, as described hereinabove with respect to step 110 of the process 100. Alternatively, in embodiments in which $T_{EC}$ is not computed as described hereinabove, step 188 may be omitted from the routine 116. In any case, the transmission control circuit 40 is thereafter operable at step 190 to determine the turbine shaft rotational speed, TS, using any one more of techniques described hereinabove.

Figure 7:
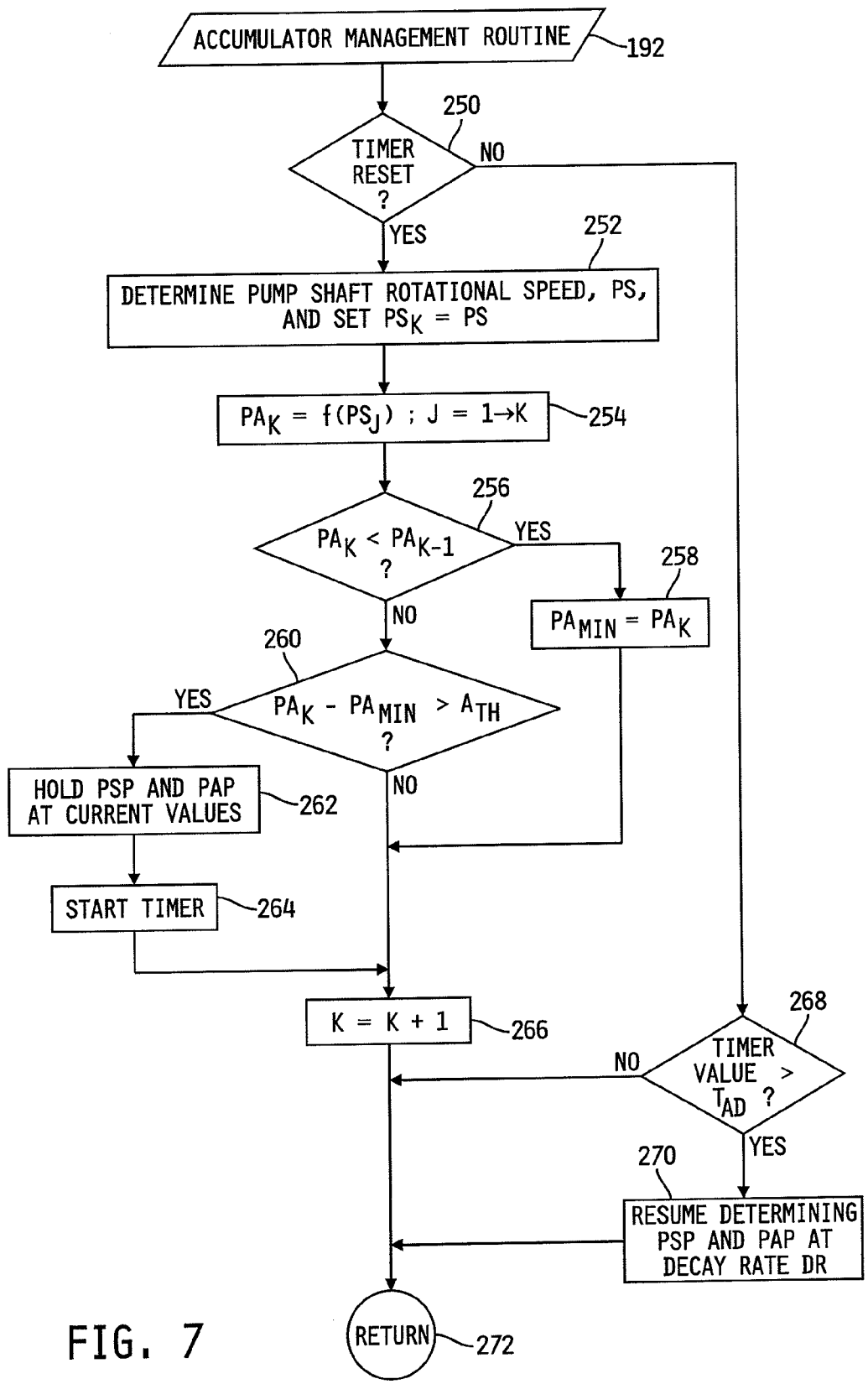
FIG. 7 is a flowchart of one illustrative embodiment of a process for managing accumulator effects during the process of FIG. 5.

Following step 190, the transmission control circuit 40 is operable at step 192 to execute an accumulator management routine 192. Referring to FIG. 7, one illustrative embodiment of the accumulator management routine 192 is shown. In the illustrative embodiment, the accumulator management routine 192 begins at step 250 where the transmission control circuit 40 is operable to determine whether the timer 44 (see FIG. 1) is reset. If so, execution of the routine 192 advances to step 252 where the transmission control circuit 40 is operable to determine the current pump shaft rotational speed, PS, and to set a $K^{th}$ value of the pump speed, $PS_K$, equal to the current value of the pump shaft rotational speed, PS. Thereafter at step 254, the transmission control circuit 40 is operable to compute a $K^{th}$ value of pump shaft acceleration, $PA_K$ as a function of the current number J, of discrete pump shaft speed values, where J may accordingly range from one to the current value of K.

The routine 192 advances from step 254 to step 256 where the transmission control circuit 40 is operable to determine whether the current or $K^{th}$ value of the pump shaft acceleration, $PA_K$, is less than the previous value of the pump shaft acceleration, $PA_{k-1}$. Illustratively, $PA_0$ is set equal to $PA_1$, so that step 256 advances through the "NO" branch to step 260 when K=1. If, at step 256, the transmission control circuit 40 determines that $PA_K$ is less than $PA_{K-1}$, the routine 192 advances to step 258 where the transmission control circuit 40 is operable to set the value of a minimum pump shaft acceleration variable, $PA_{MIN}$, equal to the current value $PA_K$, of the pump shaft acceleration. If, on the other hand, the transmission control circuit 40 determines at step 256 that $PA_K$ is greater than or equal to $PA_{K-1}$, execution of the routine 192 advances to step 260 where the transmission control circuit 40 is operable to determine whether the difference $PA_K - PA_{MIN}$ is greater than an acceleration threshold value, $A_{th}$. Illustratively, $PA_{MIN}$ is initially set equal to $PA_1$ so that execution of step 260 advances to the "NO" branch when K=1. If, at step 260, the transmission control circuit 40 determines that the difference $PA_K - PA_{MIN}$ is greater than $A_{TH}$, execution of the routine 192 advances to step 262 where the transmission control circuit 40 is operable to hold PSP and PAP at their current values, i.e., to discontinue computing PSP and PAP at the decay rate, DR, as described hereinabove with respect to step 218 of the pump shaft speed and acceleration profile determination routine 184. Following step 262, the transmission control circuit 40 is thereafter operable at step 264 to start the timer 244 (see FIG. 1). Following step 264, and also following step 258, transmission control circuit 40 is operable at step 256 to increment the value of K by one.

If, at step 250, the transmission control circuit 40 determines that the timer 44 is not reset, execution of the routine 192 advances to step 268 where the transmission control circuit 40 is operable to determine if the current value of the timer is greater than an accumulator detection time, $T_{AD}$. If so, the transmission control circuit 40 is thereafter operable at step 270 to resume determining PSP and PAP at the decay rate DR, i.e. to resume computing PSP and PAP at the decay rate DR in accordance with step 218 of the routine 184 of FIG. 6. Step 266, the "NO" branch of step 268 and step 270 all advance to step 272 where the accumulator management routine 192 is returned to step 192 of the lockup clutch control routine 116 of FIG. 5.

Referring again to FIG. 5, the lockup clutch control routine 116 advances from step 192 to step 194 where the transmission control circuit 40 is operable to compute a lockup clutch torque value $T_{LU}$, as a function of $I_E$, $T_{EC}$, PSP, PAP and TS. In one illustrative embodiment, for example, the transmission control circuit 40 is operable to execute step 194 by computing $T_{LU}$ according to the model: $T_{LU} = T_{EC} - T_P - (I_E * PAP)$, where $T_P$ represents the amount of torque transmitted by the pump 18 of the torque converter 20 with the pump speed profile, PSP, substituted for actual pump speed. Illustratively, $T_P$ is computed by the transmission control circuit 40 as a function of PSP and TS using a model-based transmitted torque model such as, but not limited to, that is described hereinabove with respect to step 108 of the process 100. Alternatively, such as in embodiments in which the engine output torque value, $T_E$, supplied by the engine control circuit 66 to the transmission control circuit 40 via one or more of the signal paths 64 is not compensated, the transmission control circuit 40 may be operable to determine the lockup clutch torque value, $T_{LU}$, according to the model: $T_{LU} = T_E - T_P - (I_E * PAP)$, where $T_E$ represents an uncompensated value of the engine output torque that may be determined according to any one or more of the techniques described hereinabove. In any case, the lockup clutch torque value $T_{LU}$, computed at step 194 corresponds to the amount of torque that the lockup clutch 32 would be transmitting under current operating conditions if the rotational speed and acceleration of the pump shaft 16 of the torque converter 20 were equal to the current values of the pump speed profile, PSP, and pump acceleration profile, PAP, respectively. Illustratively, the $T_{LU}$ model is stored in the memory unit 42 of the transmission control circuit 40, and the transmission control circuit 40 is operable at step 194 to retrieve the $T_{LU}$ model from the memory unit 42, to insert current values of the torque converter operating parameters $I_E$, $T_{EC}$ (or $T_E$), PSP, PAP and TS into the model and to then solve the model equation for $T_{LU}$.

Following step 194, the transmission control circuit 40 is operable at step 196 to modify the lockup clutch command, LCC, that is used to control the actuator 36 (see FIG. 1) based on the lockup clutch torque value, $T_{LU}$, computed at step 194. In the embodiment illustrated in FIG. 1, the lockup clutch command, LCC will typically correspond to a lockup clutch pressure command, i.e., a command to which the actuator 36 is responsive to establish a corresponding fluid pressure in the fluid conduit 34. In this embodiment, the transmission control circuit 40 is operable to modify LCC based on $T_{LU}$ by converting $T_{LU}$ from units of torque to units of pressure and to then use the converted $T_{LU}$ value as the lockup clutch command, LCC. Illustratively, the lockup clutch torque value, $T_{LU}$, may be converted to a lockup clutch pressure value, $P_{LU}$, according to the equation $P_{LU} = T_{LU} * G$ where G is a gain value and where $P_{LU}$ then corresponds to a lockup clutch pressure command. It will be understood, however, that this disclosure contemplates embodiments in which the actuator 36 is responsive to a lockup clutch torque command to control the lockup clutch 32 to transmit a corresponding torque between the pump shaft 16 and the turbine shaft 24. In any case, the transmission control circuit 40 is operable to produce the lockup clutch command, LCC, as a direct function of $T_{LU}$ computed at step 194 or as a direct substitute of $T_{LU}$ for LCC so that the model-based lockup clutch torque value, $T_{LU}$, is used to control operation of the actuator 36. As it relates to the plot of FIG. 3, the lockup clutch torque, $T_{LU}$, computed at step 194 corresponds to the increasing pressure portion 136 of the lockup clutch command, LCC, 128 between $PS_C$ (the intersection of the dashed line 124 and the pump speed 122) and a delay time following synchronous speed 137.

The lockup clutch control routine 116 advances from step 196 to step 198 where the transmission control circuit 40 is operable to determine whether synchronous speed has been achieved, i.e., whether PS=TS. If not, execution of the lockup clutch control routine 116 loops back to step 186. If, on the other hand, the transmission control circuit 40 determines at step 198 that PS=TS, execution of the lockup clutch control routine 116 advances to step 200 where the lockup clutch command, LCC, is commanded to a full or maximum value, $LCC_{MAX}$, after a time delay, TD, elapses following the determination that PS=TS. Referring once more to FIG. 3, the lockup clutch command, LCC, 128 is shown as being commanded to $LCC_{MAX}$ 138 when a time delay, TD, elapses following synchronous speed 137. Following step 200, the lockup clutch control routine 116 is returned at step 202 to the process 100 of FIG. 2. Referring once more to FIG. 2, the process 100 loops from step 116 back to step 104 for continual execution of the process 100.

In an alternative embodiment, a profile and corresponding rate of change for another one of the torque converter operating parameters that are included in the lockup clutch torque model described in the previous paragraph may be determined and substituted for the pump speed profile, PSP, and decay rate, DR. For example, a turbine speed profile may be determined in a manner similar to that described with respect to FIG. 6, and a corresponding increase rate may also be determined wherein the turbine speed profile and corresponding increase rate may be selected such that the turbine speed profile increases over time at a desired rate so as to thereafter achieve synchronous speed by intersecting with the pump speed. Alternatively still, a profile and corresponding rate of change of another one, or a combination of, the torque converter operating parameters that are included in the lockup clutch torque model described above may be determined and substituted for PSP and DR. In any such alternative embodiments, the profile may be linear, piece-wise linear or non-linear, and the corresponding rate of change may be constant or non-constant. The net effect of artificially modifying one or more of the torque converter operating parameters to solve for $T_{LU}$ would be the same as in the embodiment illustrated in the FIGS., i.e., to drive the pump speed 122 to synchronous speed (PS=TS) while controllably modifying LCC as a function of $T_{LU}$ whereby engagement of the lockup clutch 32 is continually controlled.

Figure 8:
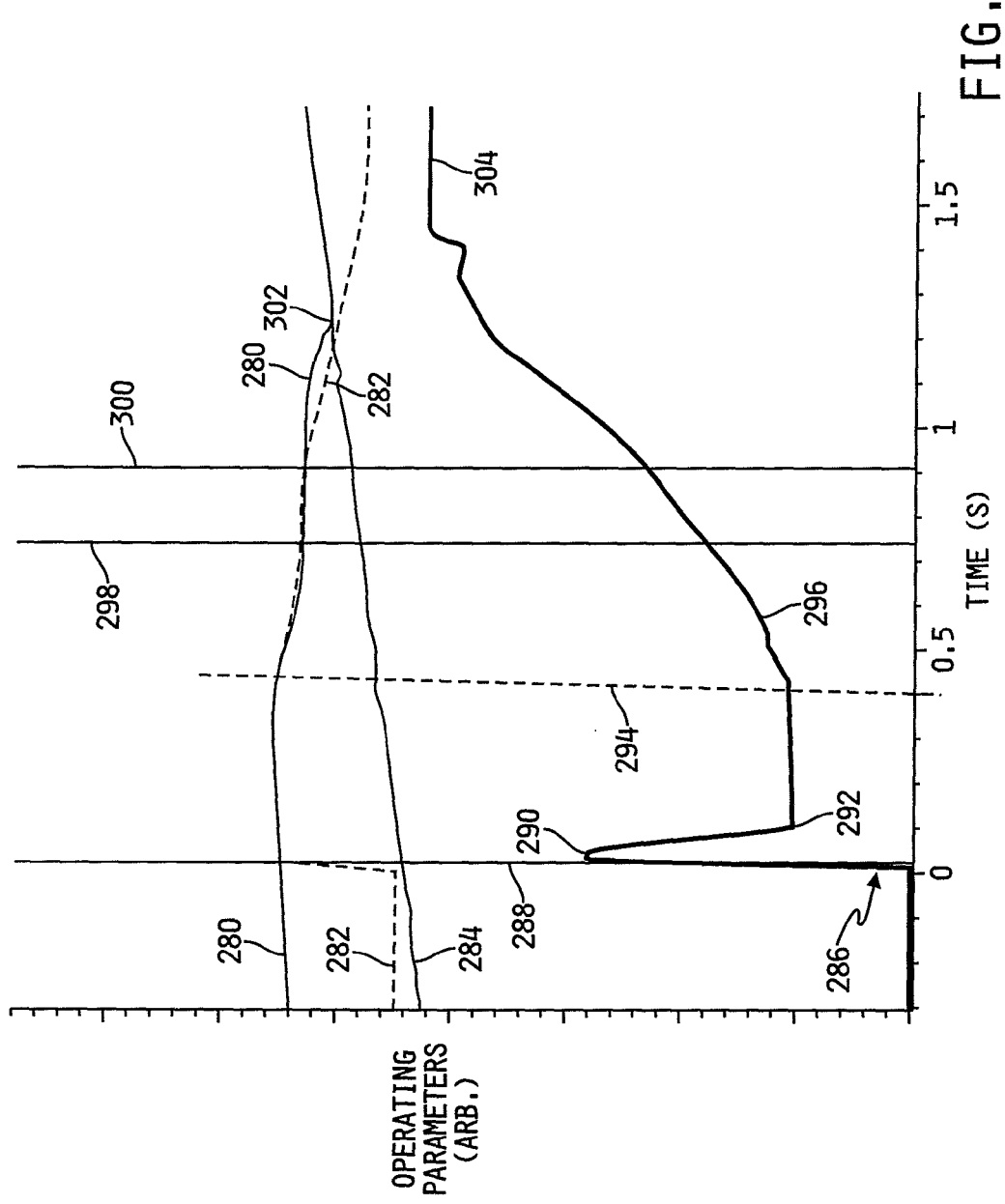
FIG. 8 is a plot of a number of operating parameters associated with lock up clutch operation during the accumulator management process of FIG. 7.

Referring now to FIG. 8, operation of the accumulator management routine 192 of FIG. 7 will be described with the aid of the illustrated plot which is similar to the plot of FIG. 3. In the plot of FIG. 8, the pump speed (PS) 280, pump speed profile (PSP) 282, turbine speed (TS) 284 and lockup clutch command (LCC) 286 are all shown vs. time (seconds). As described with respect to FIG. 3, the lockup clutch command 286 includes a fill phase in which the lockup clutch command 286 is rapidly increased to a peak value 290 and then rapidly decreased after a short duration of the peak value 290 to an initial lockup clutch activation value 292. Lockup clutch on-coming capacity thereafter occurs, and may be detected according to the lockup clutch on-coming capacity detection routine 114 of FIG. 4. In relation to FIG. 8, lockup clutch on-coming capacity occurs where the dashed line 294 intersects the pump speed 280.

Following detection of lockup clutch oncoming capacity, the lockup clutch command 286 is controllably increased, corresponding to the region 296 of the lockup clutch command 286, such as in accordance with the lockup clutch control routine 116 of FIG. 5. It has been observed that as the lockup clutch command, LCC, is controllably increased, e.g., in the region 296, such as under the control of the lockup clutch control routine 116 of FIG. 5, a short-duration, e.g., 0.1 seconds, accumulator effect may occur during which increases in the lockup clutch command 286 have no effect on the actual pump speed 280, i.e., during which increases in the lockup clutch command 128 do not result in corresponding decreases in the actual pump speed 280. The transmission control circuit 40 is operable, under control of the accumulator management routine 192, to address such accumulator effects by monitoring the deceleration rate of the pump shaft 16 after detection of lockup clutch on-coming capacity, comparing the pump shaft deceleration rate to a continually-computed maximum pump shaft deceleration rate, and holding the pump speed profile (PSP) and the pump acceleration profile (PAP) constant for a short time duration, e.g., 200 milliseconds, if the pump shaft deceleration rate rises an acceleration threshold, $A_{TH}$, above the maximum pump shaft deceleration rate. As it relates to the lockup clutch control routine 116, the phrase "holding the pump speed profile (PSP) and the pump acceleration profile (PAP) constant for a short time duration" means temporarily suspending or discontinuing the continual computation of PSP and PAP that was begun at step 218 of the pump shaft speed and acceleration profile determination routine 184 of FIG. 6, and then resuming the continual computation of PSP and PAP after the short time duration has elapsed.

The accumulator management routine 192 is executed after lockup clutch on-coming capacity is detected and during each iteration of the lockup clutch control routine 116. The transmission control circuit 40 is operable at steps 252-254 to compute pump shaft deceleration, $PA_K$, as a function of the "J" most recent pump shaft speed signal samples, where J ranges from 1 to K, and where K is a counter for the number of iterations of the main control loop (between steps 186 and 198) of the lockup clutch control routine 116. Steps 256 and 258 then continually search for and establish the maximum deceleration rate, e.g., which corresponds to a minimum value of the pump shaft acceleration ($PA_{MIN}$) since deceleration is generally understood to be negative acceleration. The true maximum pump shaft deceleration rate in the example illustrated in FIG. 8 corresponds to the vertical line 298. Step 260 compares the current pump shaft deceleration value, $PA_K$, to the most recent maximum deceleration rate, $PA_{MIN}$, and if the difference is greater than the acceleration threshold, $A_{TH}$, the transmission control circuit 40 is operable at steps 262 and 264 to hold PSP and PAP constant and to start the timer 44 (FIG. 1). Step 268 checks the timer 44 and when the time value of the timer 44 exceeds the accumulator delay time, $T_{AD}$, the transmission control circuit 40 is operable at step 270 to resume continually computing PSP and PAP as begun at step 218 of the pump shaft speed and acceleration profile determination routine 218. The end of the accumulator time delay, $T_{AD}$, in the example illustrated in FIG. 8 is indicated by the vertical line 300. In between the vertical lines 298 and 300, the pump speed profile 282 (dashed-line) is held constant as illustrated in FIG. 8. While the actual pump speed 280 and the pump speed profile 282 may thereafter deviate as shown, increases in the lockup clutch command 286 will continue to drive the actual pump speed 280 toward the turbine speed 284 until synchronous speed 302 is achieved, after which the lockup clutch command 286 may be increased to its maximum, clutch-engaged value 304.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

The invention claimed is:

1. A method for detecting lockup clutch on-coming capacity in a torque converter comprising a turbine and a pump, the method comprising:
    producing a pump speed signal corresponding to a rotational speed of the pump;
    producing a turbine speed signal corresponding to a rotational speed of the turbine;
    asserting a lockup clutch command to control engagement of a lockup clutch connected between a pump and a turbine of the torque converter;
    monitoring a plurality of torque converter operating parameters after asserting the lockup clutch command;
    continually solving a dynamic model that defines a torque transmitted by the lockup clutch as a function of the plurality of torque converter operation parameters, the torque converter operating parameters including the rotational speed of the pump and the rotational speed of the turbine;
    generating a lockup clutch on-coming capacity signal in response to the torque transmitted by the lockup clutch exceeding a torque threshold; and
    executing a lockup clutch control routine to increase the lockup clutch command to a maximum value in response to a determination that the pump rotational and the turbine rotational speed are substantially equal.

2. The method of claim 1, wherein executing the lockup clutch control routine comprises determining the pump rotational speed and the turbine rotational speed.

3. The method of claim 2, wherein executing the lockup clutch control routine comprises selecting a pump speed profile to decrease the pump rotational speed toward the turbine rotational speed so that the pump rotational speed equals the turbine rotational speed.

4. The method of claim 3, wherein selecting the pump speed profile comprises selecting a linear pump speed profile.

5. The method of claim 4, wherein selecting the linear pump speed profile comprises retrieving a stored linear pump speed profile from memory.

6. The method of claim 3, wherein selecting the pump speed profile comprises selecting a non-linear pump speed profile.

7. The method of claim 3, wherein executing the lockup clutch control routine comprises selecting a decay rate as a function of the pump rotational speed, the turbine rotational speed, and the pump speed profile to decrease the pump rotational speed toward the turbine rotational speed so that the pump rotational speed equals the turbine rotational speed.

8. The method of claim 7, wherein selecting the decay rate comprises selecting a constant decay rate.

9. The method of claim 8, wherein selecting the constant decay rate comprises retrieving a stored constant decay rate from memory.

10. The method of claim 7, wherein selecting the decay rate comprises selecting a non-constant decay rate.

11. The method of claim 7, wherein the lockup clutch control routine comprises computing a pump acceleration profile as a function of the pump speed profile, the pump rotational speed, and the decay rate.

12. The method of claim 11, wherein computing the pump acceleration profile comprises computing a pump acceleration profile as a function of time.

13. The method of claim 12, wherein computing the pump acceleration profile comprises computing a constant value pump acceleration profile.

14. A system for detecting lockup clutch on-coming capacity in a torque converter, the system comprising:
    a turbine,
    a pump engaging an output shaft of an internal combustion engine and fluidly coupled to the turbine, the lockup clutch connected between the pump and the turbine;
    a first sensor configured to produce a pump speed signal corresponding to a rotational speed of the pump;
    a second sensor configured to produce a turbine speed signal corresponding to a rotational speed of the turbine, and
    a control circuit including a memory having a plurality of instructions stored therein which, when executed by the control circuit, causes the control circuit to:
        assert a lockup clutch command to control engagement of a lockup clutch connected between a pump and a turbine of the torque converter,
        monitor a plurality of torque converter operating parameters after asserting the lockup clutch command,
        continually solve a dynamic model that defines a torque transmitted by the lockup clutch as a function of the plurality of torque converter operation parameters, the torque converter operating parameters including rotation speed of the pump and rotational speed of the turbine,
        generate a lockup clutch on-coming capacity signal in response to the torque transmitted by the lockup clutch exceeding a torque threshold, and
        execute a lockup clutch control routine to increase the lockup clutch command to a maximum value in response to a determination that the pump rotational and the turbine rotational speed are substantially equal.

15. The system of claim 14, wherein to execute a lockup clutch control routine comprises to determine the pump rotational speed and the turbine rotational speed.

16. The system of claim 14, wherein to execute a lockup clutch control routine comprises to select a pump speed profile to decrease the pump rotational speed toward the turbine rotational speed so that the pump rotational speed equals the turbine rotational speed.

17. The system of claim 16, wherein to select the pump speed profile comprises to select a non-linear pump speed profile.

18. The system of claim 16, wherein to execute a lockup clutch control routine comprises to select a constant decay rate as a function of the pump rotational speed, the turbine rotational speed, and the pump speed profile to decrease the pump rotational speed toward the turbine rotational speed so that the pump rotational speed equals the turbine rotational speed.

19. The system of claim 16, wherein to execute a lockup clutch control routine comprises to select a non-constant decay rate as a function of the pump rotational speed, the turbine rotational speed, and the pump speed profile to decrease the pump rotational speed toward the turbine rotational speed so that the pump rotational speed equals the turbine rotational speed.

20. The system of claim 16, wherein to execute a lockup clutch control routine comprises to (i) select a decay rate as a function of the pump rotational speed, the turbine rotational speed, and the pump speed profile to decrease the pump rotational speed toward the turbine rotational speed so that the pump rotational speed equals the turbine rotational speed and (ii) compute a pump acceleration profile as a function of the pump speed profile, the pump rational speed, and the decay rate.

\* \* \* \* \*